US006641628B1

(12) United States Patent
Oshio et al.

(10) Patent No.: US 6,641,628 B1
(45) Date of Patent: Nov. 4, 2003

(54) PLASTIC ABRASIVE FOR SANDBLASTING, METHOD FOR SANDBLAST PROCESSING PLASMA DISPLAY PANEL SUBSTRATE USING THE SAME AND METHOD FOR TREATING SANDBLASTING WASTE MATTERS

(75) Inventors: Kiminori Oshio, Kanagawa (JP); Hiroyuki Obiya, Kawasaki (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 380 days.

(21) Appl. No.: 09/632,614

(22) Filed: Aug. 4, 2000

Related U.S. Application Data

(62) Division of application No. 09/113,558, filed on Jul. 10, 1998, now Pat. No. 6,126,513.

(30) Foreign Application Priority Data

Jul. 10, 1997 (JP) .......................................... 9-199158

(51) Int. Cl.$^{7}$ .............................................. C09K 3/14

(52) U.S. Cl. ......................................... 51/298; 51/293

(58) Field of Search .................................. 51/298, 293

(56) References Cited

U.S. PATENT DOCUMENTS 4,858,394 A 8/1989 Lalumiere et al.
5,232,489 A 8/1993 Mertens-Gottselig
5,804,009 A 9/1998 Dings et al.
5,909,083 A 6/1999 Asano et al.
5,916,738 A 6/1999 Takehana et al.
6,063,823 A * 5/2000 Nakatani et al. .............. 521/81
6,448,328 B1 * 9/2002 Kappler et al. ............. 524/520

FOREIGN PATENT DOCUMENTS

EP 0 407 197 1/1991
EP 0 462 550 12/1991
EP 0 646 947 4/1995
EP 0 722 179 7/1996
EP 0 739 026 10/1996

OTHER PUBLICATIONS

Patent Abstracts of Japan, vol. 016, No. 339 (M–1284), Jul. 22, 1992 for JP 04 101777 A (Oki Electric Ind Co. LTD), Apr. 3, 1992.

Patent Abstracts of Japan, vol. 097, No. 010, Oct. 31, 1997 for JP 09 155743 A (Fuji Seisakusho:KK), Jun. 17, 1997.

Patent Abstracts of Japan, vol. 097, No. 006, Jun. 30, 1997 for JP 09 029837 A (Fujitsu LTD), Feb. 4, 1997.

* cited by examiner

*Primary Examiner*—Michael Marcheschi
(74) *Attorney, Agent, or Firm*—Sughrue Mion, PLLC

(57) ABSTRACT

Plastic abrasives for sandblasting, in particular, those to be used in sandblast processing for forming barrier ribs and priming ribs; a sandblast processing method with the use of the same; and a method for treating sandblasting waste matters. A plastic abrasive for sandblasting characterized by being soluble in organic solvents or water/organic solvent mixtures and comprising plastic particles having an average particle size of 5 to 100 μm; a method for sandblast processing a plasma display panel substrate by using the plastic abrasive; and a method for treating sandblasting waste matters.

2 Claims, No Drawings

PLASTIC ABRASIVE FOR SANDBLASTING, METHOD FOR SANDBLAST PROCESSING PLASMA DISPLAY PANEL SUBSTRATE USING THE SAME AND METHOD FOR TREATING SANDBLASTING WASTE MATTERS

This is a divisional of application Ser. No. 09/113,558 filed Jul. 10, 1998, U.S. Pat. No. 6,126,513 the disclosure of which is incorporated herein by reference.

FIELD OF THE INVENTION

The present invention relates to a plastic abrasive for sandblasting; a method for sandblast processing a plasma display panel substrate using the same; and a method for treating waste matters generated during sandblast processing. More particularly, it relates to a plastic abrasive which is used in sandblast processing for forming cellular or linear structures composed of barrier ribs and/or priming ribs in a plasma display panel substrate; a method for sandblast processing a plasma display panel substrate using the plastic abrasive; and a method for treating waste matters generated during the sandblast processing.

BACKGROUND OF THE INVENTION

Sandblast processing has been known as a processing method to be used in surface-patterning glasses, marbles, plastics, ceramics, leathers, woods, etc. In this method, patterns are drawn by forming a sandblast resist on the surface of a material to be processed, and spraying an abrasive or the like onto the exposed portions of the resist to selectively grind the resist. In particular, fine processing can be achieved by using a sandblasting-resistant photosensitive resin as the sandblasting resist, forming a sandblasting mask pattern by means of photolithography and then spraying an abrasive or the like onto the exposed portions. This technique is applied to the formation of circuit substrates in which metal patterns and insulating patterns are present in admixture, in particular, metal wiring patterns and insulating patterns made of ceramics, luminophors, etc. in plasma display panel (hereinafter referred to simply as "PDP").

PDPs are prepared by forming a cellular or linear structure comprising barrier ribs and priming ribs on a substrate such as glass, providing an electrode and a luminophor layer within the cellular structure or between the linear structures, and introducing a discharge gas thereinto to give a display device. As proposed, for example, by JP-A-2-301934 (the term "JP-A" as used herein means an "unexamined published Japanese patent application"), the cellular or linear structure can be formed by applying on a substrate a composition containing an inorganic powder (e.g., a glass frit having a low melting point) and an appropriate vehicle and drying it to thereby form a paste layer, forming a sandblast-resistant photosensitive resin composition layer thereon, forming a mask pattern for the cell drawing by a lithographic means, effecting sandblasting via the mask pattern to peel off and remove the sandblast-resistant photosensitive resin composition layer, and baking.

The abrasives used in this sandblast processing are those comprising inorganic fine particles having a particle size of 2 to 500 μm such as glass beads, SiC, $SiO_2$, $Al_2O_3$ and $ZrO_2$.

However, the use of these abrasives comprising inorganic fine particles in the sandblast processing results in a large amount of powders of ground electrodes, luminophors, barrier ribs and priming ribs, as well as the fine particles of the abrasives, which are mixed together. The mixture is discarded as wastes as such, since it is difficult to classify the particles in the mixture. This brings about a serious problem in terms of environment.

Under these circumstances, the present inventors have conducted extensive studies, and found out that when specific plastic particles are used as an abrasive in sandblast processing, not only an excellent sandblasting performance can be achieved but also the abrasive in the sandblasting waste matters can be easily removed. This makes it possible to reuse the sandblasting waste matters and to avoid the environmental problem associating the disposal of the sandblasting waste matters. The present invention has been completed based on such findings.

SUMMARY OF THE INVENTION

Accordingly, an object of the present invention is to provide a plastic abrasive for sandblasting which has excellent performance in sandblasting and enables the reuse of waste matters generated in sandblasting.

Another object of the present invention is to provide a method for sandblast processing a PDP substrate using the above-mentioned plastic abrasive.

A further object of the present invention is to provide a method for treating waste matters generated during sandblast processing.

In order to achieve the above objects, the present invention provides a plastic abrasive for sandblasting which is soluble in an organic solvent or a mixture of water and an organic solvent and comprises plastic particles having an average particle size of 5 to 100 μm;

a method for sandblast-processing a plasma display panel substrate, which comprises applying a paste composition on a plasma display panel substrate, drying the same to form a paste layer, forming a sandblasting-resistant photosensitive resin composition layer thereon, selectively irradiating the photosensitive resin composition layer with actinic rays to form an exposed pattern, effecting development to form a mask pattern for sandblasting and then grinding exposed portions with the plastic abrasive for sandblasting; and a method for treating sandblasting waste matters which comprises treating waste matters generated during sandblast processing with an organic solvent or a mixture of water and an organic solvent to thereby remove the plastic abrasive.

DETAILED DESCRIPTION OF THE INVENTION

As described above, the plastic abrasive for sandblasting of the present invention is required to not only be easily soluble in an organic solvent or a mixture of water and an organic solvent but also be comparable in sandblasting performance to those comprising inorganic particles. Any plastic particles are usable as long as they satisfy the above requirements, but plastic particles of acrylonitrile/polyethylene chloride/styrene resin are preferred. The average particle size of the plastic particles preferably ranges from 5 to 100 μm, though it can be determined appropriately depending on the processing accuracy, thickness, etc. of the material to be processed. When the average particle size is less than 5 μm, a long time is needed for the sandblast processing. When it exceeds 100 μm, on the other hand, fine processing becomes difficult in some cases. From a practical viewpoint, it is preferable to use plastic particles containing at least 80% by weight of particles of not more than about 100 $\mu$m in particle size. The particle size of such plastic particles can be adjusted by conditions of grinding such as impact grinding and air current grinding.

As the organic solvent or mixture of water/organic solvent in which the plastic particles are soluble, ketone solvents, ester solvents, and water/alcohol solvents are preferred in terms of the cost and handling properties. More specifically, preferred examples of the solvent include acetone, methyl ethyl ketone, ethyl acetate, water/methanol, water/ethanol and water/isopropyl alcohol.

In order to improve the cutting properties in the sandblast processing, a material can be once ground with the plastic particles having a large particle size within the range as specified above and then finished with plastic particles having a smaller particle size.

As described above, the plastic abrasive of the present invention is easily soluble in an organic solvent or a mixture of water and an organic solvent. After the completion of the sandblast processing, therefore, inorganic components such as barrier ribs and/priming ribs, electrodes and luminophors can be easily recovered and reused, since the water/organic solvent mixture thus recovered are free from contaminants. As a result, there arises no environmental problem due to the disposal of the sandblasting waste matters.

Now, a concrete example of the sandblast processing method by using the plastic abrasive of the present invention will be illustrated.

This method involves the following steps: (i) the step of applying onto a PDP substrate (e.g., glass) a paste composition comprising an inorganic powder and an appropriate vehicle by screen printing and the like, and drying the same to form a paste layer; (ii) the step of applying onto the paste layer a solution of a sandblasting-resistant photosensitive resin composition by using an applicator, a bar coater, a roll coater, a curtain flow coater, etc. and drying to form a photosensitive resin composition layer; or (iii) the step of forming an undercoat composition layer for sandblasting on the paste layer and then forming a sandblasting-resistant photosensitive resin composition layer thereon; (iv) the step of adhering a mask having a predetermined mask pattern to the photosensitive resin composition layer, irradiating the composite material via the mask pattern with actinic rays and effecting development to form a mask pattern for sandblasting; and (v) the step of spraying a plastic abrasive thereon through the mask pattern for sandblasting and selectively grinding the exposed portions. In this sandblast processing method, the layer of the undercoat composition for sandblasting and the sandblasting-resistant photosensitive resin composition layer each can be formed by applying a dry film comprising a support film having formed thereon the corresponding composition layer. It is particularly preferable to use the dry film, since positioning can be easily performed to thereby enable accurate cutting.

The exposure may be carried out by directly drawing with argon laser beams, YAG-SHG laser beams, etc. without using any mask.

Examples of the inorganic powder contained in the paste composition to be applied onto the PDP substrate include glasses comprising oxides of various elements (e.g., Si, B, Pb, Na, K, Mg, Ca, Ba, Ti, Zr, and Al), such as lead borate glass and zinc borate glass; cobalt oxide, chromium oxide, nickel oxide, copper oxide, manganese oxide, neodymium oxide, vanadium oxide, cerium oxide, cipec yellow, cadmium oxide, alumina, silica, magnesia, spinel, luminophors such as $Y_2SiO_5$:Ce, $CaWO_4$:Pb, $BaMgAl_{14}O_{23}$:Eu, ZnS:(Ag,Cd), $Y_2O_3$:Eu, $Y_2SiO_5$:Eu, $Y_3Al_5O_{12}$: Eu, $Zn_3(PO_4)_2$:Mn, $YBO_3$Eu, (Y,Gd)$BO_3$:Eu, $GdBO_3$:Eu, $ScBO_3$:Eu, $LuBO_3$:Eu, $Zn_2SiO_4$:Mn, $BaAl_{12}O_{19}$:Mn, $SrAl_{13}O_{19}$:Mn, $CaAl_{12}O_{19}$:Mn, $YBO_3$:Tb, $BaMgAl_{14}O_{23}$:Mn, $LuBO_3$:Tb, $GdBO_3$:Tb, $ScBO_3$:Tb, $Sr_6Si_3O_3Cl_4$:Eu, ZnO:Zn, ZnS:(Cu,Al), ZnS:Ag, $Y_2O_3S$:Eu, ZnS:Zn, (Y,Cd)$BO_3$:Eu, $BaMgAl_{12}O_{23}$:Eu, and electrically conductive particles such as those of iron, nickel, copper, aluminum, silver and gold. Examples of the vehicle include high-molecular-weight compounds such as cellulose, carboxymethyl cellulose, hydroxyethyl cellulose, hydroxypropyl cellulose, methyl cellulose, ethyl cellulose, ethylhydroxyethyl cellulose, carboxymethylethyl cellulose and (meth)acrylate polymers. The paste layer generally has a thickness of 100 to 200 $\mu$m.

Examples of the sandblasting-resistant photosensitive resin composition to be applied onto the inorganic paste layer include a photosensitive resin composition containing a photopolymerizable urethane (meth)acrylate compound having at least two (meth)acryloyl groups, an alkali-soluble high-molecular-weight compound having an acid value of 50 to 250 mg KOH/g and a photopolymerization initiator, and, if needed, a Lewis acid salt, which is soluble in an organic solvent and capable of forming a Lewis acid when photo-irradiated, as described in JP-A-9-127692. The coating film formed by the photosensitive resin composition has high elasticity, high softness and excellent alkali-developability, good adhesion to materials, and a high sandblasting-resistance, and undergoes little static build-up, thus scarcely suffering from discharge or struck by lightening.

As the photopolymerizable urethane (meth)acrylate compounds having at least two (meth)acryloyl groups, it is preferable to use products obtained by reacting a compound having a terminal isocyanate (—NCO) group, which is formed by reacting a diol compound with a diisocyanate compound, with a (meth)acrylate compound having hydroxyl group(s). Examples of the diol compound include polyesters and polyethers having terminal hydroxyl groups. Examples of the polyesters include polyesters formed by ring-opening polymerization of lactones, polycarbonates, and polyesters formed by condensing alkylene glycols (e.g., ethylene glycol, propylene glycol, diethylene glycol, triethylene glycol, and dipropylene glycol) with dicarboxylic acids (e.g., maleic acid, fumaric acid, glutaric acid, and adipic acid). Examples of the polyethers include polyethylene glycol, polypropylene glycol, polytetramethylene glycol and polypentamethylene glycol. Examples of the diisocyanate compound to be reacted with the diol compound include aliphatic or alicyclic diisocyanate compounds such as dimethylene diisocyanate, trimethylene diisocyanate, tetramethylene diisocyanate, pentainethylene diisocyanate, hexamethylene diisocyanate, heptamethylene diisocyanate, 2,2,-dimethylpentane-1,5-diisocyanate, octamethylene diisocyanate, 2,5-dimethylhexane-1,6-diisocyanate, 2,2,4-trimethylpentane-1,5-diisocyanate, nonamethylene diisocyanate, 2,2,4-trimethylhexane diisocyanate, decamethylene diisocyanate and isophorone diisocyanate. These compounds may be used singly or a mixture of two or more thereof.

Examples of the (meth)acrylate compound having hydroxyl group(s) include hydroxymethyl acrylate, hydroxymethyl methacrylate, 2-hydroxyethyl acrylate, 2-hydroxyethyl methacrylate, 3-hydroxypropyl acrylate, 3-hydroxypropyl methacrylate, ethylene glycol monoacrylate, ethylene glycol monomethacrylate, glycerol acrylate, glycerol methacrylate, dipentaerythritol monoacrylate and dipentaerythritol monomethacrylate. These compounds may be used singly or a mixture of two or more thereof.

As the alkali-soluble high-molecular-weight compound, copolymers of acrylic acid or methacrylic acid and carboxyl-containing cellulose resins are preferred. The acid value of the alkali-soluble high-molecular-weight compound generally ranges from 50 to 250 mg KOH/g, preferably from 80 to 200 mg KOH/g. When the acid value is less than 50 mg KOH/g, there sometimes arises underdevelopment. When the acid value exceeds 250 mg KOH/g, on the other hand, the softness and moisture resistance are deteriorated. As the copolymers of acrylic acid or methacrylic acid, it is preferable to use acrylic acid or methacrylic acid/methyl acrylate, methyl methacrylate, ethyl acrylate or ethyl methacrylate. It is still preferable to use therefor the above combinations further together with n-butyl acrylate or n-butyl methacrylate/acrylonitrile or methacrylonitrile. Preferred examples of the carboxyl-containing cellulose resin include hydroxyethyl carboxymethyl cellulose, cellulose acetate phthalate and hydroxypropylmethyl cellulose phthalate. Among all, it is particularly preferable to use cellulose acetate phthalate or hydroxypropylmethyl cellulose phthalate, since these resins are highly compatible with the carboxy-modified urethane (meth)acrylate compound, excellent in film-forming properties when processed into a dry film and have good alkali developability.

Examples of the photopol-ymerization initiator include 1-hydroxycyclohexyl phenyl ketone, 2,2-dimethoxy-1,2-diphenylethan-1-one, 2-methyl-1-[4-(methylthio)phenyl]-2-morpholinopropan-1-one, 2-benzyl-2-dimethylamino-1-(4-morpholinophenyl)-butan-1-one, 2-hydroxy-2-methyl-1-phenylpropan-1-one, 2,4,6-trimethylbenzoyldiphenylphosphine oxide, 1-[4-(2-hydroxyethoxy)phenyl]-2-hydroxy-2-methyl-1-propan-1-one, 2,4-diethylthioxanthone, 2-chlorothioxanthone, 2,4-dimethylthioxanthone, 3,3-dimethyl-4-methoxybenzophenone, benzophenone, 1-chloro-4-propoxythioxanthone, 1-(4-isopropylphenyl)-2-hydroxy-2-methylpropan-1-one, 1-(4-dodecylphenyl)-2-hydroxy-2-methylpropan-1-one, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 2-ethylhexayl 4-dimethylaminobenzoate, 2-isoamyl 4-dimethylaminobenzoate, 2,2-diethoxyacetophenone, benzyldimethyl ketal, benzyl-β-methoxyethyl acetal, 1-phenyl-1,2-propanedione-2-(o-ethoxycarbonyl)oxime, methyl o-benzoylbenzoate, bis(4-dimethylaminophenyl) ketone, 4,4'-bisdiethylaminobenzophenone, 4,4'-dichlorobenzophenone, benzil, benzoin, benzoin methyl ether, benzoin ethyl ether, benzoin propyl ether, benzoin-n-butyl ether, benzoin isobutyl ether, benzoin butyl ether, p-dimethylaminoacetophenone, p-tert-butyltrichloroacetophenone, p-tert-butyldichloroacetophenone, thioxanthone, 2-methylthioxanthone, 2-isopropylthioxanthone, dibenzosuberone, α,α-dichloro-4-phenoxyacetophenone andpentyl-4-dimethylaminobenzoate. These-compounds may be used singly or a mixture of two or more thereof.

In addition to the components as described above, the photosensitive resin composition can further contain a photopolymerizable monomer so as to prevent film reduction or swelling in the development. Examples of the photopolymerizable monomer include monofunctional monomers such as acrylic acid, methacrylic acid, fumaric acid, maleic acid, monomethyl fumarate, monoethyl fumarate, 2-hydroxyethyl acrylate, 2-hydroxyethyl methacrylate, ethylene glycol monomethyl ether acrylate, ethylene glycol monomethyl ether methacrylate and polyfunctional monomers such as trimethylolpropane triacrylate, trimethylolpropane trimethacrylate, tetramethylolpropane tetraacrylate, tetramethylolpropane tetramethacrylate, pentaerythritol triacrylate, pentaerythritol trimethacrylate, pentaerythritol tetraacrylate, pentaerythritol tetramethacrylate and dipentaerythritol pentaacrylate. These compounds can be used singly or a mixture of two or more thereof. Furthermore, the composition may contain inorganic powders contained in the material to be processed.

The sandblasting-resistant photosensitive resin composition layer can be formed by a method which comprises dissolving the photosensitive resin composition in an arbitrary solvent and applying the resultant solution onto the paste layer to give a dry film thickness of 10 to 100 μm by using an applicator, a bar coater, a roll-coater, a curtain flow coater, and the like, and drying. Another method comprises preparing a dry film by applying the photosensitive resin composition onto a support film and providing a release film thereon, peeling off the release film of the dry film, pressing the face thus exposed onto the paste layer, and then peeling off the support film. After the formation of the sandblasting-resistant photosensitive resin composition layer, a mask having a predetermined mask pattern is adhered to the sandblasting-resistant photosensitive resin composition layer. Then, the composite material is irradiated with actinic ray via the mask pattern, followed by development. Alternatively, the exposure may be carried out by directly drawing with argon laser beams, YAG-SHG laser beams and the like, without using any nega-mask, followed by development. Thus, a mask pattern for sandblasting can be formed.

Examples of the support film which is useful for the dry film include synthetic resin films having a thickness of 15 to 125 μm, which are made of polyethylene terephthalate, polyethylene, polypropylene, polycarbonate, or polyvinyl chloride.

The release film is a film which can stably protect the photosensitive resin composition layer and has an appropriate releasing property such that it can be easily peeled off at the use but does not peel before the use. Examples thereof include silicone-coated or -baked, PET films, polypropylene films, and polyethylene films, having a -thickness of 15 to 125 μm. Examples of the source for actinic ray which can be used in the exposure include a low-pressure mercury lamp, a high-pressure mercury lamp, an ultra-high-pressure mercury lamp, an arc lamp and a xenon lamp.

Examples of the solvent include ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol monopropyl ether, ethylene glycol dipropyl ether, propylene glycol monomethyl ether, propylene glycol monoethyl ether, propylene glycol monopropyl ether, propylene glycol monobutyl ether, propylene glycol dimethyl ether, propylene glycol diethyl ether, diethylene glycol monomethyl ether, diethylene glycol monoethyl ether, diethylene glycol monophenyl ether, diethylene glycol dimethyl ether, diethylene glycol diethyl ether, ethylene glycol monomethyl ether acetate, ethylene glycol monoethyl ether acetate, ethylene glycol monopropyl ether acetate, ethylene glycol monobutyl ether acetate, ethylene glycol monophenyl ether acetate, diethylene glycol monomethyl ether acetate, diethylene glycol monoethyl ether acetate, diethylene glycol monopropyl ether acetate, diethylene glycol monophenyl ether acetate, propylene glycol monomethyl ether acetate, propylene glycol monoethyl ether acetate, propylene glycol monopropyl ether acetate, 2-methoxybutyl acetate, 3-methoxybutyl acetate, 4-methoxybutyl acetate, 2-methyl-3-methoxybutyl acetate, 3-methyl-3-mehtoxybutyl acetate, 3-ethyl-3-methoxybutyl acetate, 2-ethoxybutyl acetate, 4-ethoxybutyl acetate, 4-propoxybutyl acetate, 2-methoxypentyl acetate, 3-methoxypentyl acetate, 4-methoxypentyl acetate, 2-methyl-3-methoxypentyl acetate, 3-methyl-3-methoxypentyl acetate, 3-methyl-4-methoxypentyl acetate, 4-methyl-4-methoxypentyl acetate, acetone, methyl ethyl ketone, diethyl ketone, methyl isobutyl ketone, ethyl isobutyl ketone, tetrahydrofuran, cyclopentanone, cyclohexanone, methyl propionate, ethyl propionate, propyl propionate, isopropyl propionate, methyl 2-hydroxypropionate, ethyl 2-hydroxypropionate, 2-hydroxy-2-methyl-3-methoxypropionate, ethyl-3-methoxypropionate, ethyl-3-ethoxypropionate, ethyl-3-propoxypropionate, propyl-3-methoxypropionate, isopropyl-3-methoxypropionate, ethyl ethoxyacetate, ethyl oxyacetate, methyl 2-hydroxy-3-methylbutanoate, methyl lactate, ethyl lactate, propyl lactate, isopropyl lactate, butyl lactate, isoamyl lactate, methyl acetate, ethyl acetate, propyl acetate, isopropyl acetate, butyl acetate, isoamyl acetate, methyl carbonate, ethyl carbonate, propyl carbonate, butyl carbonate, methyl pyruvate, ethyl pyruvate, propyl pyruvate, butyl pyruvate, methyl acetoacetate, ethyl acetoacetate, benzyl methyl ether, benzyl ethyl ether, dihexyl ether, benzyl acetate, ethyl benzoate, diethyl oxalate, diethyl maleate, γ-butyrolatone, benzene, toluene, xylene, cyclohexanone, methanol, ethanol, propanol, butanol, hexanol, cyclohexanol-, ethylene glycol, diethylene glycol and glycerol. These solvents can be used singly or a mixture of two or more thereof.

As the developer to be used in the development, it is preferable to use an alkali developer commonly employed in the art, for example, aqueous solutions of hydroxides, carbonates, bicarbonates, phosphates and pyrophosphates of alkali metals (e.g., lithium, sodium, potassium, and calcium), primary amines (e.g., benzylamine and butylamine), secondary amines (e.g., dimethylamine, dibenzylamino, and diethanolamine), tertiary amines (e.g., trimethylamine, criethylamine, and triethanolamine), cyclic amines (e.g., morpholine, piperazine, and pyridine), polyamines (e.g., ethylenediamine, and hexamethylenediamine), ammonium hydroxides (tetraethylammonium hydroxide, trimethylbenzylammonium hydroxide, and trimethylphenylbenzylammonium hydroxide) and sulfonium hydroxides (trimethylsulfonium hydroxide, diethylmethylsulfonium hydroxide, and dimethylbenzylsulfonium hydroxide) and buffer solutions containing choline, silicates, and the like.

To form the sandblasting-resistant photosensitive resin composition layer, it is advantageous to preliminarily form an undercoat composition layer for sandblasting on the paste layer. The formation of this undercoat composition layer for sandblasting makes it possible to prevent the sandblasting-resistant photosensitive resin composition from penetrating into the inorganic paste layer,—thus avoiding decoloration of the insulating layer, variation in insulation resistance, etc. As the above-mentioned undercoat composition layer for sandblasting, it is preferable to use an undercoat composition containing a modified acrylic resin obtained by reacting a part of the carboxyl groups in a linear (meth)acrylic copolymer containing (meth)acrylic acid as the essential component with a compound having thermally polymerizable or thermally crosslinkable group(s). The linear (meth) acrylic copolymer containing (meth)acrylic acid as the essential component can be obtained by polymerizing a (meth)acrylic acid monomer with a compound having ethylenic unsaturated group(s) (except for (meth)acrylic acid monomers) in the presence of a photopolymerization initiator at 70 to 125° C. approximately for 1 to 15 hours. Examples of the (meth)acrylic acid monomer include acrylic acid and methacrylic acid. Examples of the compound having ethylenic unsaturated group(s) (except for (meth) acrylic acid) include methyl acrylate, methyl methacrylate, ethyl acrylate, ethyl methacrylate, isobutyl acrylate, isobutyl methacrylate, 2-hydroxyethyl acrylate, 2-hydroxyethyl methacrylate, ethylene glycol monomethyl ether acrylate, ethylene glycol monomethyl ether methacrylate, glycerol acrylate, glycerol methacrylate, acrylic acid amide, methacrylic acid amide, acrylonitrile, methyacrylonitrile, 2-ethylhexyl acrylate, 2-ethylhexyl methacrylate, benzyl acrylate, benzyl methacrylate, ethylene glycol monoacrylate, ethylene glycol monomethacrylate, triethylene glycol monoacrylate, triethylene glycol monomethacrylate, tetraethylene glycol monoacrylate, tetraethylene glycol monomethacrylate, butylene glycol monoacrylate, butylene glycol monomethacrylate, propylene glycol monoacrylate and propylene glycol monomethacrylate. The compounds having ethylenic unsaturated group(s) can be used singly or a mixture of two or more thereof.

Examples of the compound having thermally polymerizable or thermally crosslinkable group(s), which is to be reacted with the linear (meth)acrylic copolymer, include (meth)acrylates having glycidyl group(s); (meth)acrylates having alicyclic epoxy groups; vinyl isocyanate compounds; and products obtained by reacting hydroxyalkyl (meth) methylacrylate with dimethylene diisocyanate, trimethylene diisocyanate, tetramethylene diisocyanate, pentamethylene diisocyanate, hexamethylene diisocyanate, heptamethylene diisocyanate, 2,2-dimethylpentane-1,5-diisocyanate, octamethylene diisocyanate, 2,5-dimethylhexane-1,6-diisocyanate, 2,2,4-trimethylhexane diisocyanate, 2,4,4-trimethylhexane diisocyanate and decamethylene diisocyanate. Examples of the (meth)acrylates having glycidyl group(s) include glycidyl acrylate and glycidyl methacrylate. Examples of the vinyl isocyanate compounds include vinyl isocyanate, 2-methacryloyloxyethyl isocyanate and m-isopropenyl-α,α-dimethylbenzyl isocyanate. Among all, it is preferable to use 2-methacryloyloxyethyl isocyanate. The compound having thermally polymerizable or thermally crosslinkable group(s) is reacted at a reaction ratio of from 5 to 100% by mol, preferably from 50 to 100% by mol, based on the carboxyl groups in the linear (meth) acrylic copolymer. When the reaction ratio is less than 5% by mol, the adhesion to the sandblasting-resistant photosensitive resin composition is deteriorated.

The above-mentioned modified acrylic resin has a weight-average molecular weight of from 5,000 to 500,000 (preferably from 8,000 to 100,000) and an acid value of from 0 to 225 mg KOH/g (preferably from 0 to 150 mg KOH/g). When the weight-average molecular weight thereof is less than 5,000, the undercoat composition shows a poor film-formability. When the weight-average molecular weight exceeds 500,000, a substrate layer with uniform thickness cannot be formed in some cases. It is not preferable that the acid value exceeds 225 mg KOH/g, since the softness is lowered or the adhesion to the sandblasting-resistant photosensitive resin composition is deteriorated, thus causing peeling-off or cracking in the sandblasting-resistant photosensitive resin composition during the development. This undercoat composition layer for sandblasting is formed by dissolving the composition in the above-mentioned solvent and then applying the resultant solution onto the substrate by using an application means such as an applicator, a bar coater, a spinner, and a curtain flow coater. Alternatively, it may be screen-printed onto the substrate or adhered as a dry film, as done in the formation of the sandblasting-resistant photosensitive resin composition layer. The undercoat composition layer generally has a thickness of 0.5 to 2 μm.

To further illustrate the present invention in greater detail, and not by way of limitation, the following examples will be given. The term "%" as used herein means % by weight.

EXAMPLE 1

The following components were well stirred and kneaded together to give a solution of a sandblasting-resistant photosensitive resin composition.

| | |
|---|---|
| Carboxyl-containing urethane manufactured by Daicel Chemical Industries, Ltd. ACRYLATE "KRM 7222" (weight-average molecular weight: 10,000, acid value: 20 mg KOH/g, containing 20% of ethyl acetate solvent) | 35 parts by weight |
| Carboxyl-containing urethane manufactured by The Nippon Synthetic Chemical Industry Co., Ltd. ACRYLATE "SICO UT-2313" (weight-average molecular weight: about 20,000, acid value: 0 mg KOH/g, containing 30% of ethyl acetate solvent) | 32 parts by weight |
| Cellulose acetate phthalate "KC-71" (manufactured by Wako Pure Chemicals Industries, Ltd., acid value: 120 mg KOH/g, containing 75% of methyl ethyl ketone solvent) | 30 parts by weight |
| 2,4-Diethylthioxanthone | 2 parts by weight |
| 2-Isoamyl 4-dimethylaminobenzoate | 1 parts by weight |
| Dimethylbenzyl ketal | 0.05 parts by weight |
| ($\eta^5$-2,4-Cylcopentadien-1-yl) [(1,2,3,4,-5,6-$\eta$)-(1-methylethyl)benzene]-iron (1+)-hexafluorophosphate (1-) | 0.1 parts by weight |
| Ethyl acetate | 30 parts by weight. |

The sandblasting-resistant photosensitive resin composition solution thus prepared was coated onto a PET film of 50 μm in thickness by using an applicator such that the film after drying had a thickness of 30 μm. In a semi-dried state, another PET film of 25 μm in thickness was adhered thereto to form a dry film.

Next, one of the PET films of the dry film was peeled off and the photosensitive resin composition layer face thus exposed was adhered and laminated at 80° C. onto a plasma display panel substrate provided with barrier ribs (lead borosilicate glass frit layer) over electrode patterns. Then, the remaining PET film was peeled off and the photosensitive resin composition layer was irradiated with an ultra-high- pressure mercury lamp at 150 mJ/cm$^2$ via a nega-mask. Subsequently, spray development was carried out by using a 0.2% aqueous solution of sodium carbonate under a spray pressure of 1.5 kg/cm$^2$ for 60 seconds. After washing with water, the sandblasting-resistant photosensitive resin composition pattern was completely hardened by drying at 80° C. for 10 minutes. When evaluated with the naked eye, neither cutout nor peeling was observed in the pattern. By using the obtained pattern as a sandblasting-resistant mask, sandblasting was performed under a blast pressure of 3 kg/cm$^2$ for 5 minutes using acrylonitrile/polyethylene chloride/styrene resin (average particle size: 10 μm) as an abrasive and the glass layer (barrier ribs) was ground by 150 μm to expose the electrode pattern. Next, the residual sandblasting-resistant photosensitive resin composition was peeled off by using a 10% aqueous solution of triethanolamine as a peeling solution. As a result, any unpeeled portion was observed neither in the exposed electrode pattern nor in the glass layer. Moreover, the glass pattern suffered from neither any cutoff nor peeling.

1 kg of grinding wastes formed by the above-mentioned sandblast processing were poured into 10 l of a solution of methyl ethyl ketone and stirred for 1 hour to thereby dissolve the abrasive. Then, the residue was separated by filtration. After repeating these procedures twice, a lead borosilicate glass frit was obtained. This lead borosilicate glass frit was free from any contaminants and, therefore, reusable as a barrier rib material.

EXAMPLE 2

One of the PET films of a dry film of the sandblasting-resistant photosensitive resin composition, which had been prepared according to the same method as in Example 1, was peeled off and the photosensitive resin composition layer face thus exposed was adhered and laminated at 80° C. onto a plasma display panel substrate provided with barrier ribs (lead borosilicate glass frit layer) over electrode patterns. Then, the remaining PET film was peeled off and the photosensitive resin composition layer was irradiated with an ultra-high-pressure mercury lamp at 100 mJ/cm$^2$ via a nega-mask. Subsequently, spray development was carried out by using a 0.2% aqueous solution of sodium carbonate under a spray pressure of 1.5 kg/cm$^2$ for 60 seconds. After washing with water, the sandblasting-resistant photosensitive resin composition pattern was dried at 80° C. for 10 minutes, and then completely hardened by UV-irradiation at 200 mJ/cm$^2$. When evaluated with the naked eye, neither cutout nor peeling was observed in the obtained pattern.

By using the obtained pattern as a sandblasting-resistant mask, sandblasting was performed under a blast pressure of 3 kg/cm$^2$ for 5 minutes using SOARNOL D2908 (manufactured by The Nippon Synthetic Chemical Industry Co., Ltd., ethylene/vinyl alcohol copolymer resin, average particle size: 25 μm) as an abrasive and the glass layer was ground by 150 μm to expose the electrode pattern. Next, the residual sandblasting-resistant photosensitive resin composition was peeled off by using a 10% aqueous solution of triethanolamine as a peeling solution. As a result, any unpeeled portion was observed neither in the exposed electrode pattern nor in the glass layer. Moreover, the glass pattern suffered from neither any cutoff nor peeling.

1 kg of grinding wastes-formed by the above-mentioned sandblast processing were poured into 10 l of a mixture of water/isopropyl alcohol (50/50 by weight ratio) and stirred for 1 hour to thereby dissolve the abrasive. Then, the residue was separated by filtration. After repeating these procedures twice, a lead borosilicate glass frit was obtained. This lead borosilicate glass frit was free from any contaminants and, therefore, reusable as a barrier rib material.

COMPARATIVE EXAMPLE

One of the PET films of a dry film of the sandblasting-resistant photosensitive resin composition, which had been prepared according to the same method as in Example 1, was peeled off and the photosensitive resin composition layer face thus exposed was adhered and laminated at 80° C. onto a plasma display panel substrate provided with barrier ribs (lead borosilicate glass frit layer) over electrode patterns. Then, the remaining PET film was peeled off and the photosensitive resin composition layer was irradiated with an ultra-high-pressure mercury lamp at 100 $mJ/cm^2$ via a nega-mask. Subsequently, spray development was carried out by using a 0.2% aqueous solution of sodium carbonate under a spray pressure of 1.5 $kg/cm^2$ for 60 seconds. After washing with water, the pattern of the sandblasting-resistant photosensitive resin composition was dried at 80° C. for 10 minutes and then completely hardened by UV-irradiation at 200 $mJ/cm^2$.

By using the obtained pattern as a sandblasting-resistant mask, sandblasting was performed under a blast pressure of 3 $kg/cm^2$ for 5 minutes using silicon carbide (average particle size: 10 $\mu$m) as an abrasive and the glass layer was ground by 150 $\mu$m to expose the electrode pattern. However, the grinding wastes formed by the sandblast processing (i.e., a mixture of the lead borosilicate glass frit and silicon carbide) could not be reused, since they could not separated.

The plastic abrasive for sandblasting according to the present invention is soluble in an organic solvent or a mixture of water and organic solvent and, moreover, comparable in sandblasting performance to the conventional abrasives. When used in sandblast processing, therefore, these abrasives make it possible to form excellent barrier ribs and priming ribs. Moreover, these plastic abrasives can be easily removed from sandblasting waste matters, e.g., by means of decantation, the barrier rib and priming rib materials can be reused, and any environmental problem due to the disposal of the waste matters is not caused.

While the invention has been described in detail and with reference to specific embodiments thereof, it will be apparent to one skilled in the art that various changes and modifications can be made therein without departing from the spirit and scope thereof.

What is claimed is:

1. A plastic abrasive for sandblasting, which is soluble in an organic solvent or a mixture of water and an organic solvent and comprises plastic particles having an average particle size of 5 to 100 $\mu$m, wherein said plastic particles are acrylonitrile/polyethylene chloride/styrene resin particles.

2. The plastic abrasive for sandblasting of claim 1, wherein said organic solvent or mixture of water and organic solvent are ketone solvents, ester solvents or water/alcohol solvents.

* * * * *